Jan. 15, 1929.　　　　　　　　　　　　　　　　　1,699,387
J. P. ANDERSON
OPERATING VALVE FOR PRESSURE OPERATED DUMP CAR
Filed Nov. 23, 1927　　　　3 Sheets-Sheet 1
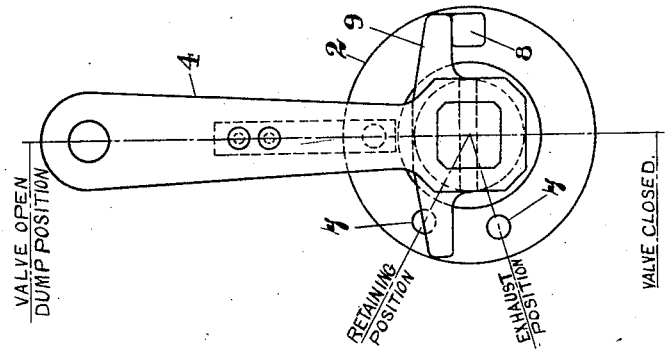
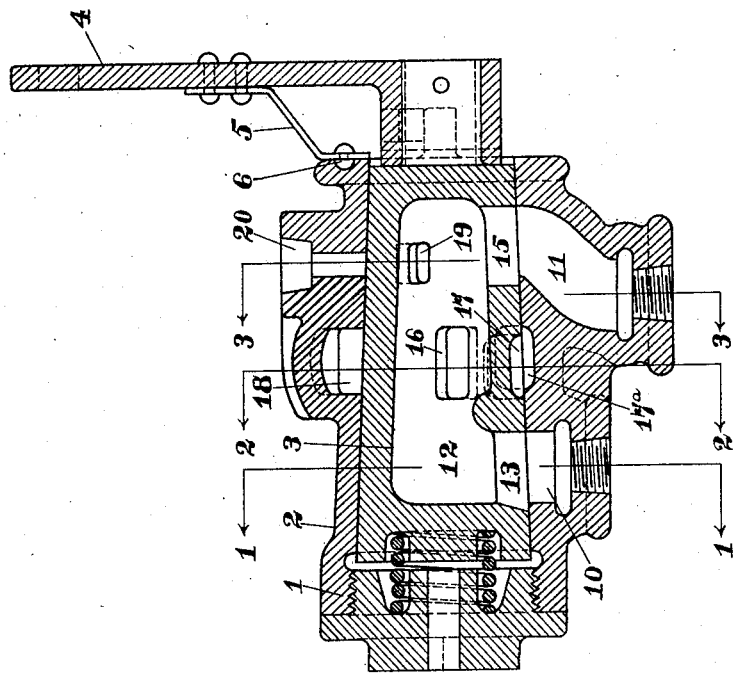
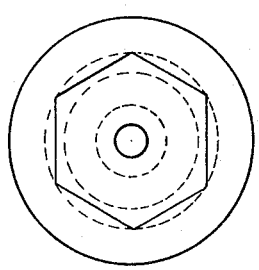
WITNESS
William Dinning
INVENTOR
John P. Anderson,
by G. C. Laube
Atty.

Jan. 15, 1929.

J. P. ANDERSON 1,699,387

OPERATING VALVE FOR PRESSURE OPERATED DUMP CAR

Filed Nov. 23, 1927     3 Sheets-Sheet 2

VALVE CLOSED

WITNESS
William Dinning

INVENTOR
John P. Anderson,
by A. Laube
Atty.

Jan. 15, 1929. 1,699,387
J. P. ANDERSON
OPERATING VALVE FOR PRESSURE OPERATED DUMP CAR
Filed Nov. 23, 1927 3 Sheets-Sheet 3

VALVE OPEN

EXHAUST POSITION

RETAINING POSITION

WITNESS
William Dinning

INVENTOR
John P. Anderson,
by G. P. Laube
Atty.

Patented Jan. 15, 1929.

1,699,387

UNITED STATES PATENT OFFICE.

JOHN P. ANDERSON, OF KOPPEL, PENNSYLVANIA, ASSIGNOR TO KOPPEL INDUSTRIAL CAR AND EQUIPMENT COMPANY, OF PITTSBURGH, PENNSYLVANIA, A CORPORATION, OF PENNSYLVANIA.

OPERATING VALVE FOR PRESSURE-OPERATED DUMP CARS.

Application filed November 23, 1927. Serial No. 235,217.

An object of the invention is to provide a fluid pressure operated dump car with a valve to control the pressure operating system of the car either as a unit or in a train of such dump cars.

Another object of the invention is to provide such a valve with a safety port to exhaust any leaking pressure to the atmosphere when the valve is closed.

Another object of the invention is to provide such a valve with an auxiliary pressure retaining valve to permit retention of pressure in the body tilting cylinders of the car.

The subject matter of this invention is to be used with a dump car having pressure operated body tilting cylinders, a pressure reservoir and a pressure supply line similar to that shown in the application filed by me jointly with Alfred C. Schmohl Ser. No. 244,877, filed Jan. 6, 1928.

Figure 8:
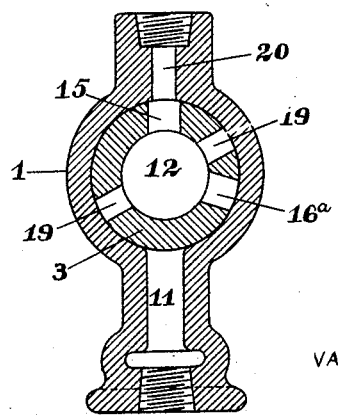
Figure 9:
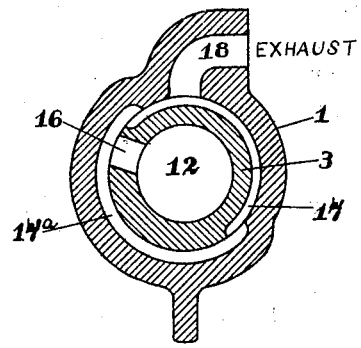
Figure 4:
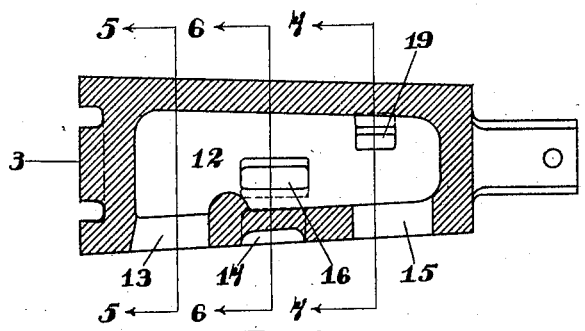
Figure 5:
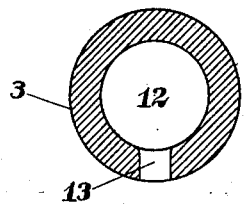
Figure 6:
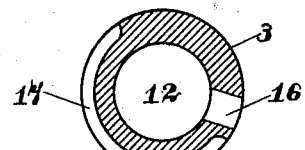
Figure 7:
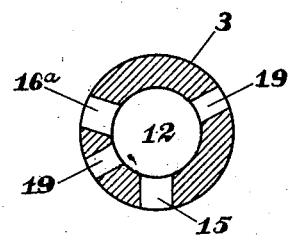
Figure 10:
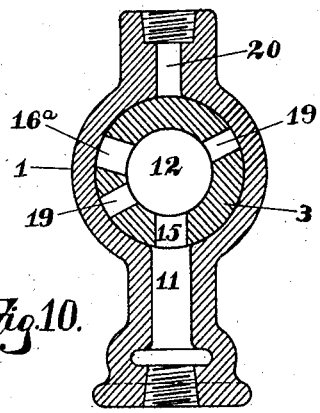
Figure 11:
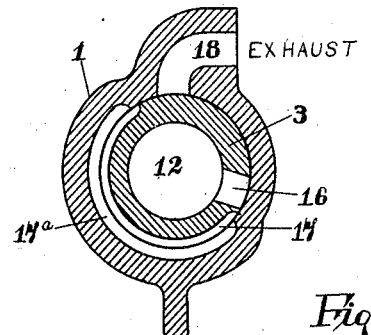
Figure 12:
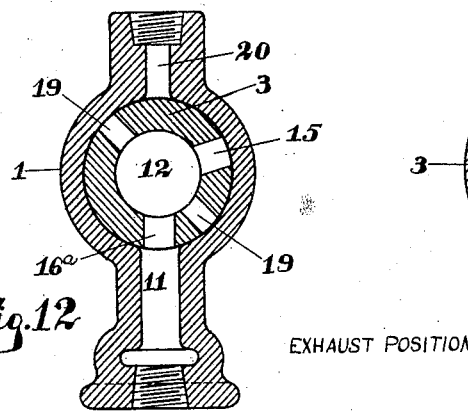
Figure 13:
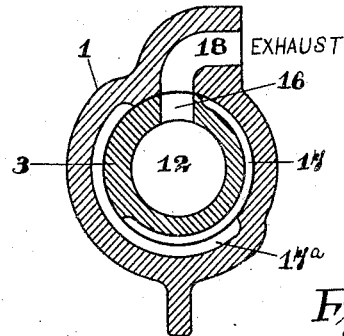
Figure 14:
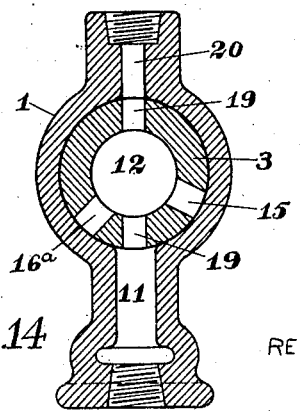
Figure 15:
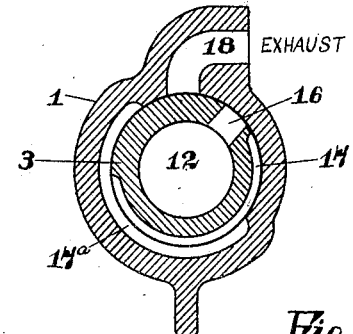

Referring to the drawings, Fig. 1 is a section through the valve; Fig. 2 is an end view of the valve; Fig. 3 is an end view of the valve showing the operating handle and positioning stops on the valve casing; Fig. 4 is a sectional view of the valve plug; Fig. 5 is a section through the valve plug at the lines 5—5; Fig. 6 is a section through the valve plug at the line 6—6; Fig. 7 is a section through the valve plug at the lines 7—7; Figs. 8 and 9 are sections through the valve at the lines 3—3 and 2—2 when the valve is closed; Figs. 10 and 11 are sections through the valve at the lines 3—3 and 2—2 showing positions of the valve plug when the valve is open; Figs. 12 and 13 are sections through the valve at the lines 3—3 and 2—2 showing the valve plug when the valve is in exhausting position, and Figs. 14 and 15 are figures through the valve at the lines 3—3 and 2—2 showing the positions of the valve plug when the valve is in retaining position.

Referring now in detail to the drawings, reference character 1 indicates the operating valve having a casing 2 with a rotatable plug portion 3 contained therein and a handle 4 attached to the valve plug for rotating the plug into its various operative positions. Attached to the handle 4 is a spring 5 adapted to contact with the valve casing 2 and having a tip 6 fitting in the openings 7 on the valve casing when the valve is in its various operating positions. A stop 8 on the valve casing engages arms 9 of the handle to prevent the handle from being turned to rotate the valve plug beyond its various operating positions.

Contained on the casing 2 of the valve is a reservoir inlet 10 and an operating outlet 11 communicating to their respective members through the hollow portion 12 of the valve plug. A port 13 of the valve plug connects the interior of the plug to the reservoir inlet 10, and port 15 communicates the interior of the valve plug to the casing outlet 11, and the port 16 and channel 17 selectively connect the valve plug to an exhaust opening 18 in the valve casing, and a port 19 connects the valve plug to the retaining valve connection 20 of the valve casing.

When the valve is open the pressure from the pressure reservoir enters the valve through the pressure inlet 10 and the valve port 13 to the interior 12 of the valve plug, and then outward through the port 15 to the operating line outlet 11. This position of the valve plug and the valve ports is shown in Figs. 1, 10 and 11.

When the valve handle is turned to the exhaust position, as shown by Figs. 12 and 13, the valve plug 3 is rotated until the exhaust ports 18 in the casing and the port 16 in the valve plug connect the interior 12 of the valve plug to the atmosphere and the port 13 cuts off the pressure from the reservoir, port 16ª connects the interior of the plug to the operating line, and the pressure in the operating lines is allowed to exhaust through the valve to the atmosphere.

When the valve handle is turned to the position marked "Retaining position" in Fig. 3, the valve plug is rotated, as shown in Figs. 14 and 15, until the port 19 connects the operating pressure line, through the casing port 11, to the interior of the valve plug, thence through the port 19 to the casing outlet 20 containing the pressure retaining valve. The reservoir inlet port 13 is closed and the port 16 of the valve plug is moved out of connection with the exhaust outlet 18 of the casing causing the pressure to exhaust through the retaining valve. With the retaining valve set to close at a predetermined pressure, it automatically closes when the pressure is sufficiently reduced and retains such reduced pressure in the operating system until such time as it is desirable to release this pressure.

When the valve handle of this car is turned to the position marked "Valve closed" in Fig. 3, this rotates the valve plug as shown in Figs. 8 and 9 and disconnects the port 13 from the reservoir inlet 10 and disconnects the operating pressure line at the casing inlet 11 as shown in Fig. 8 and connects the two exhaust channels 17 and 17$^a$ of the casing and valve plug as shown in Fig. 9 to the exhaust outlet 18 of the casing. Should any pressure then leak past the valve plug at the reservoir inlet 10, the pressure passes around the valve plug into the channels 17 and 17$^a$ in the valve and exhausts to the atmosphere through the exhaust port 18. This prevents any likelihood of the pressure leaking through the valve and building up in the operating line.

Having thus described the invention what I claim as new and desire to secure by Letters Patent is:

1. In a control valve for a pressure operated mechanism comprising an outer casing and an inner hollow plug portion rotatable on its longitudinal axis, a pressure supply inlet and an operating line outlet on said casing, ports in the walls of said hollow plug portion selectively connecting and disconnecting the interior of said hollow plug portion with said casing connections, a safety port in said plug, a channel in said casing adjacent and partly surrounding said plug, and an outlet in said casing to the atmosphere, said channel connecting said safety port and outlet to the atmosphere when said inlet port is closed.

2. In a control valve for a pressure operated mechanism comprising an outer casing, an inner hollow plug portion rotatable on its longitudinal axis, an outlet on said casing to an operating line and an inlet for a pressure supply, ports in the walls of said hollow plug portion selectively connecting and disconnecting the interior of said hollow plug portion to said casing connections, an outlet in said casing to the atmosphere, and a port in said hollow plug portion selectively connecting with said outlet for exhausting the pressure from said operating line when the pressure supply port is closed.

3. In a control valve for a pressure operated mechanism comprising an outer casing and an inner hollow plug portion rotatable on its longitudinal axis, a connection on said casing to an operating line and to a pressure supply, ports in the wall of said hollow plug portion selectively connecting and disconnecting the interior of said hollow plug portion to said casing connections, an outlet in said casing adapted to receive a retaining valve, and ports in said hollow plug portion selectively connecting and disconnecting said retaining valve outlet and operating outlet when the port to said pressure supply is closed.

4. In a control valve for a pressure operated mechanism comprising an outer casing and an inner hollow plug portion rotatable on its longitudinal axis, a connection on said casing to a pressure supply, a connection on said casing to an operating line, ports in the walls of said hollow plug portion selectively connecting and disconnecting the interior of said hollow plug portion to said casing connections, an outlet in said casing adapted to receive a pressure retaining valve, an outlet in said casing to the atmosphere, and ports in said hollow plug portion selectively connecting and disconnecting said retaining valve and exhaust outlets to said operating line when said port to the pressure supply is closed.

5. In a control valve for a pressure operated mechanism comprising an outer casing and an inner hollow plug portion rotatable on its longitudinal axis, a connection on said casing to a pressure supply, a connection on said casing to an operating line, ports in the walls of said hollow plug portion selectively connecting and disconnecting the interior of said hollow plug portion to said casing connections, an outlet in said casing adapted to receive a pressure retaining valve, an outlet in said casing to the atmosphere, ports in said hollow plug portion selectively connecting and disconnecting said outlets to said operating line outlet when said pressure supply line port is closed, and a channel in said casing adjacent to and partly surrounding said hollow plug portion operable to connect the interior of the valve casing to said exhaust outlet when all other ports in said hollow plug portion are closed.

In testimony whereof I affix my signature.

JOHN P. ANDERSON.